United States Patent
Ikeda

(10) Patent No.: US 10,136,024 B2
(45) Date of Patent: Nov. 20, 2018

(54) IMAGE PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Toru Ikeda, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/406,470

(22) Filed: Jan. 13, 2017

(65) Prior Publication Data

US 2017/0208205 A1    Jul. 20, 2017

(30) Foreign Application Priority Data

Jan. 18, 2016 (JP) ................. 2016-007425

(51) Int. Cl.
| | | |
|---|---|---|
| *G06F 3/12* | (2006.01) | |
| *G03G 15/00* | (2006.01) | |
| *H04N 1/32* | (2006.01) | |
| *H04N 1/00* | (2006.01) | |
| *G06K 15/00* | (2006.01) | |

(52) U.S. Cl.
CPC ....... *H04N 1/32657* (2013.01); *H04N 1/0048* (2013.01); *H04N 1/00554* (2013.01); *H04N 1/00925* (2013.01); *H04N 1/3263* (2013.01); *H04N 2201/0082* (2013.01); *H04N 2201/3267* (2013.01)

(58) Field of Classification Search
CPC ........... H04N 1/00408; H04N 1/00588; H04N 1/00625; H04N 1/00771; H04N 1/00777; H04N 1/00761; H04N 1/00045; H04N 1/0049; H04N 1/00411; H04N 1/00488; H04N 1/00076; H04N 1/00037; H04N 1/32657; G03G 15/502; G03G 15/70; G06F 3/12
USPC ........ 358/1.11–1.18, 1.1, 1.9, 2.1; 399/8–21, 399/81; 715/705–709
See application file for complete search history.

(56) References Cited

U.S. PATENT DOCUMENTS

| | | | |
|---|---|---|---|
| 2008/0278739 A1 | 11/2008 | Kudo | |
| 2013/0135646 A1* | 5/2013 | Akiyama | G06F 3/12 358/1.13 |
| 2014/0167580 A1* | 6/2014 | Funayama | E05B 47/0012 312/237 |
| 2015/0104211 A1* | 4/2015 | Sato | G03G 15/502 399/81 |
| 2015/0109637 A1 | 4/2015 | Ikeda | |
| 2015/0172477 A1* | 6/2015 | Yamamoto | H04N 1/3263 358/1.15 |

FOREIGN PATENT DOCUMENTS

| | | |
|---|---|---|
| CN | 103869649 A | 6/2014 |
| CN | 104714381 A | 6/2015 |
| JP | 2000-147850 A | 5/2000 |
| JP | 2000147850 A * | 5/2000 |

(Continued)

*Primary Examiner* — Chad Dickerson
(74) *Attorney, Agent, or Firm* — Canon U.S.A. Inc., IP Division

(57) ABSTRACT

An image processing apparatus locks a particular cover so as not to be opened based on a particular jam being detected, and displays a particular screen for notifying a user that the particular cover is locked.

10 Claims, 11 Drawing Sheets

(56) References Cited

FOREIGN PATENT DOCUMENTS

| | | |
|---|---|---|
| JP | 2008-170865 A | 7/2008 |
| JP | 2008-282217 A | 11/2008 |
| JP | 2009-145689 A | 7/2009 |
| JP | 2010-039391 A | 2/2010 |
| JP | 2014-119511 A | 6/2014 |
| JP | 2015-074210 A | 4/2015 |
| JP | 2015-082706 A | 4/2015 |
| JP | 2015-106288 A | 6/2015 |
| JP | 2015-160703 A | 9/2015 |

* cited by examiner

| MAINTENANCE ID | CORRESPONDING SENSOR POSITION BIT | MOVING IMAGE LIST |
|---|---|---|
| 001 | BIT 1 | A1 |
|  |  | A2 |
|  |  | A3 |
|  |  | A6 |
| 002 | BIT 3 | A7 |
|  |  | A4 |
|  |  | A5 |
|  |  | A8 |
| 003 | BIT 1, BIT 3, BIT 4 | A1 |
|  |  | A2 |
|  |  | A3 |
|  |  | A6 |
|  |  | A7 |
|  |  | A4 |
|  |  | A5 |
|  |  | A8 |
| 004 | — | B1 |
|  |  | B5 |
|  |  | B6 |
|  |  | B7 |
|  |  | B14 |
| 005 | BIT 6 | A9 |
|  |  | A10 |
|  |  | A11 |
| 006 | BIT 5, BIT 6 | A9 |
|  |  | A10 |
|  |  | A11 |

FIG.4B

| MOVING IMAGE ID | MOVING IMAGE FILE | PLAY TIME | COVER OPEN/CLOSE FLAG | MESSAGE |
|---|---|---|---|---|
| A1 | /movie/A1.mpeg | 0.10 | 0 | PLEASE OPEN RIGHT COVER. |
| A2 | /movie/A2.mpeg | 0.20 | 1 | PLEASE REMOVE PAPER IN CONVEYING UNIT. |
| A3 | /movie/A3.mpeg | 0.20 | 1 | PLEASE REMOVE PAPER IN CONVEYING UNIT. |
| A4 | /movie/A4.mpeg | 0.20 | 1 | PLEASE REMOVE PAPER IN TRANSFER UNIT. |
| A5 | /movie/A5.mpeg | 0.20 | 1 | PLEASE REMOVE PAPER IN TRANSFER UNIT. |
| A6 | /movie/A6.mpeg | 0.10 | 1 | PLEASE CLOSE RIGHT COVER. |
| A7 | /movie/A7.mpeg | 0.10 | 0 | PLEASE OPEN FRONT COVER. |
| A8 | /movie/A8.mpeg | 0.10 | 1 | PLEASE CLOSE FRONT COVER. |
| A9 | /movie/A9.mpeg | 0.10 | 0 | YOU OPEN COVER OF FEEDER. |
| A10 | /movie/A10.mpeg | 0.20 | 1 | YOU REMOVE PAPER JAM. |
| A11 | /movie/A11.mpeg | 0.10 | 1 | YOU CLOSE COVER OF FEEDER. |
| B1 | /movie/B1.mpeg | 0.10 | 0 | PLEASE OPEN TONER COVER. |
| B2 | /movie/B2.mpeg | 0.20 | 1 | PLEASE TAKE OUT EMPTY MAGENTA TONER CARTRIDGE. |
| B3 | /movie/B3.mpeg | 0.40 | 1 | PLEASE PREPARE NEW MAGENTA TONER CARTRIDGE. |
| B4 | /movie/B4.mpeg | 0.30 | 1 | PLEASE ATTACH NEW MAGENTA TONER CARTRIDGE. |
| B5 | /movie/B5.mpeg | 0.20 | 1 | PLEASE TAKE OUT EMPTY CYAN TONER CARTRIDGE. |
| B6 | /movie/B6.mpeg | 0.40 | 1 | PLEASE PREPARE NEW CYAN TONER CARTRIDGE. |
| B7 | /movie/B7.mpeg | 0.30 | 1 | PLEASE ATTACH NEW CYAN TONER CARTRIDGE. |
| B8 | /movie/B8.mpeg | 0.20 | 1 | PLEASE TAKE OUT EMPTY YELLOW TONER CARTRIDGE. |
| B9 | /movie/B9.mpeg | 0.40 | 1 | PLEASE PREPARE NEW YELLOW TONER CARTRIDGE. |
| B10 | /movie/B10.mpeg | 0.30 | 1 | PLEASE ATTACH NEW YELLOW TONER CARTRIDGE. |
| B11 | /movie/B11.mpeg | 0.20 | 1 | PLEASE TAKE OUT EMPTY BLACK TONER CARTRIDGE. |
| B12 | /movie/B12.mpeg | 0.40 | 1 | PLEASE PREPARE NEW BLACK TONER CARTRIDGE. |
| B13 | /movie/B13.mpeg | 0.30 | 1 | PLEASE ATTACH NEW BLACK TONER CARTRIDGE. |
| B14 | /movie/B14.mpeg | 0.10 | 1 | PLEASE CLOSE TONER COVER. |

FIG.4C

| SENSOR | SENSOR POSITION BIT |
|---|---|
| CONVEYING UNIT SENSOR | BIT 1 |
| TWO-SIDED UNIT SENSOR | BIT 2 |
| TRANSFER UNIT SENSOR | BIT 3 |
| FRONT COVER LOCK SENSOR | BIT 4 |
| MULTI-FEED DETECTION SENSOR | BIT 5 |
| READING UNIT SENSOR | BIT 6 |

IMAGE PROCESSING APPARATUS, METHOD FOR CONTROLLING THE SAME, AND STORAGE MEDIUM

BACKGROUND OF THE INVENTION

Field of the Invention

The present invention relates to a method for displaying work for maintenance for an image processing apparatus.

Description of the Related Art

Conventionally, an image processing apparatus configured to present work for maintenance, such as the removal of a jam, the replacement of a toner cartridge, or the refilling of staples, using a moving image is discussed (Japanese Patent Application Laid-Open No. 2008-282217). This configuration is intended to enable a user to perform maintenance more smoothly with high expressivity and an abundant amount of information presented by the moving image.

There may be a precaution of which the user performing work for maintenance should be notified, depending on the state of the image processing apparatus. For example, if the apparatus is erroneously operated to remove jammed paper, the jammed paper may be torn. Thus, to prevent this, a particular cover may be locked so as not to be opened. At this time, if the user attempts to forcibly open the particular cover without being aware of the locking of the cover, this leads to the failure of the apparatus.

SUMMARY OF THE INVENTION

The present invention is directed to notifying a user of information to which the user should pay attention, before presenting works required to remove a particular maintenance event occurring in an image processing apparatus to the user.

According to an aspect of the present invention, an image processing apparatus includes a detection unit configured to detect a jam of a sheet, a locking control unit configured to, based on the detection unit detecting a particular jam, lock a particular cover so as not to be opened, and a display control unit configured to display a particular screen for notifying a user that the particular cover is locked.

Further features of the present invention will become apparent from the following description of exemplary embodiments with reference to the attached drawings.

BRIEF DESCRIPTION OF THE DRAWINGS

FIGS. 4A, 4B, and 4C are data configuration diagrams in which relationships between maintenance events and moving images are defined, according to an exemplary embodiment of the present invention.

DESCRIPTION OF THE EMBODIMENTS

With reference to the drawings, a first exemplary embodiment of the present invention is described below.

Figure 1:
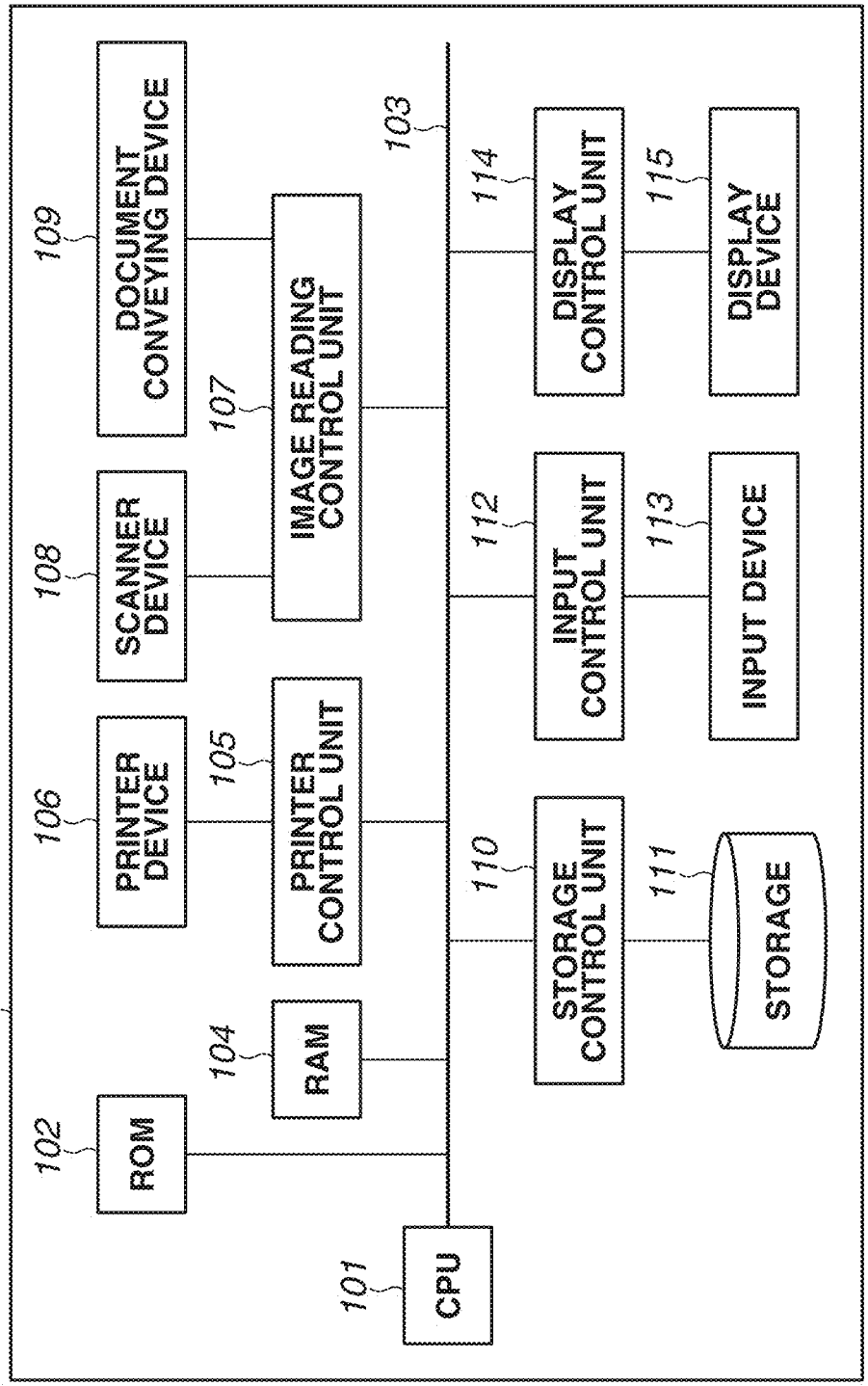
FIG. 1 is a block diagram illustrating a hardware configuration of an image forming apparatus according to an exemplary embodiment of the present invention.

FIG. 1 is a block diagram illustrating a general configuration of an image forming apparatus 100, such as a multi-function peripheral, according to the present exemplary embodiment.

In FIG. 1, the image forming apparatus 100 includes a central processing unit (CPU) 101, a read-only memory (ROM) 102, a random-access memory (RAM) 104, a printer control unit 105, an image reading control unit 107, a storage control unit 110, an input control unit 112, and a display control unit 114. These components are connected together via a bus 103.

Further, the image forming apparatus 100 includes a storage 111, a printer device 106, a scanner device 108, a document conveying device 109, an input device 113, and a display device 115.

The CPU 101 controls the entirety of the image forming apparatus 100. The CPU 101 starts an operating system (OS) by a boot program stored in the ROM 102. Then, the CPU 101 executes on the OS a program stored in the storage 111. The RAM 104 is used as a temporary storage area such as a main memory or a work area for the CPU 101. In executing a program, the CPU 101 reads the program from the storage 111 and stores the read program in the RAM 104.

The printer control unit 105 controls the printer device 106 so as to print image data on a sheet such as paper. The printer device 106 prints image data on a sheet.

The image reading control unit 107 controls the scanner device 108 so as to generate image data. Further, the image reading control unit 107 controls the document conveying device 109 such as an auto document feeder (ADF) so as to convey each document placed on a document platen of the document conveying device 109 to the scanner device 108, thereby generating image data. The scanner device 108 scans a document using an optical reading device such as a charge-coupled device (CCD) image sensor and converts image information of the document into electric signal data.

The storage 111 is a readable and writable non-volatile storage device such as a hard disk drive (HDD). The storage 111 stores a program for controlling the entirety of the image forming apparatus 100, various application programs, and various pieces of data such as a moving image representing work for maintenance. Then, these programs are executed by the CPU 101. The storage control unit 110 controls the storage 111.

The input control unit 112 receives, from the input device 113 such as a touch panel or a hardware key, an operation instruction given by a user. The display control unit 114 controls the display device 115 such as a liquid crystal display (LCD) or a cathode ray tube (CRT) display so as to display an operation screen or a moving image to the user.

Figure 2:
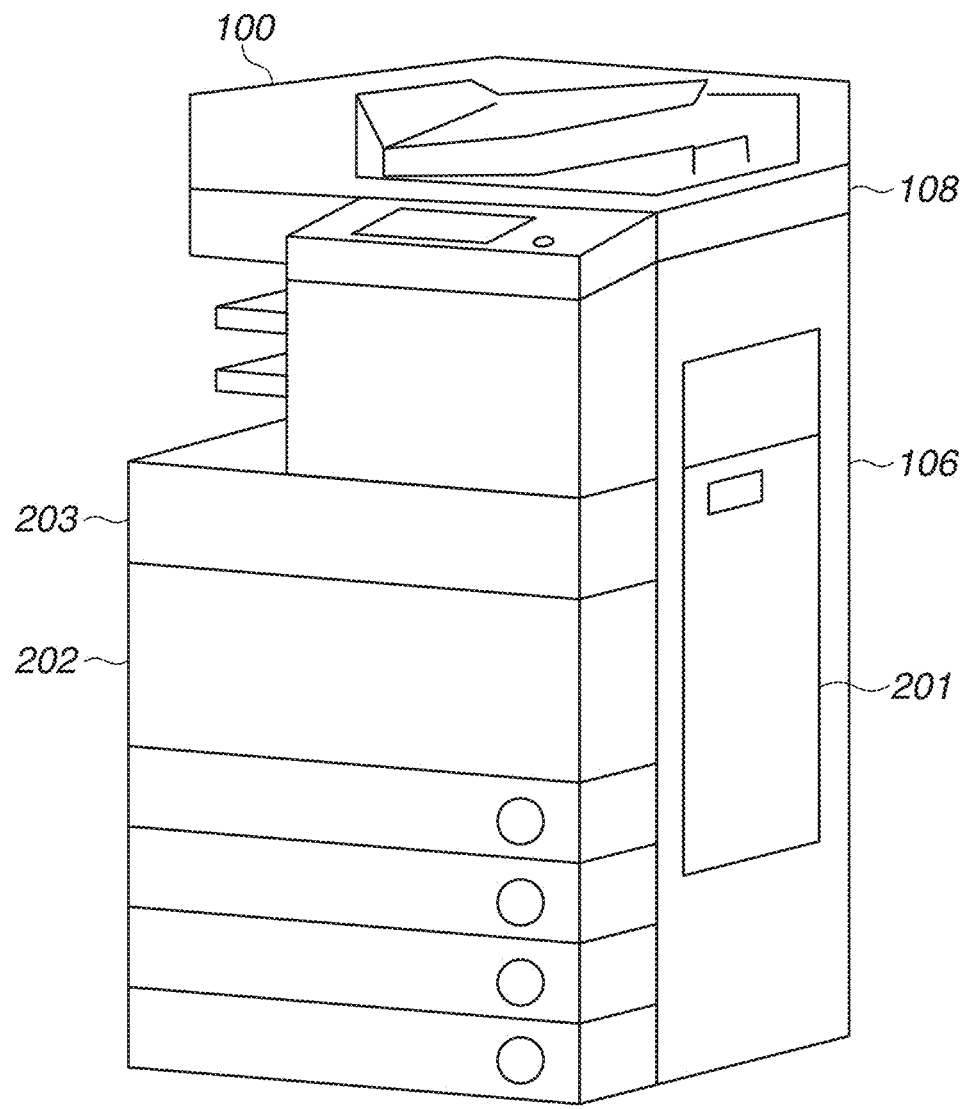
FIG. 2 is an external view illustrating an external appearance of the image forming apparatus according to an exemplary embodiment of the present invention.

FIG. 2 is an external view illustrating the external appearance of the image forming apparatus 100.

FIG. 2 illustrates a right cover 201, a front cover 202, and a toner cover 203, which are provided in the image forming apparatus 100.

The right cover 201 is used to expose a conveying path of a print sheet to remove jammed paper. The front cover 202 is used to pull out a transfer unit (described below) to remove jammed paper. The front cover 202 has a locking mechanism. To prevent the user from mistakenly opening the front cover 202, the front cover 202 can be automatically locked so as not to be mistakenly opened. The toner cover 203 is used to expose a toner container attachment portion when toner is replaced. The image forming apparatus 100 includes sensors for detecting the opening/closing states of the right cover 201, the front cover 202, and the toner cover 203.

Figure 3:
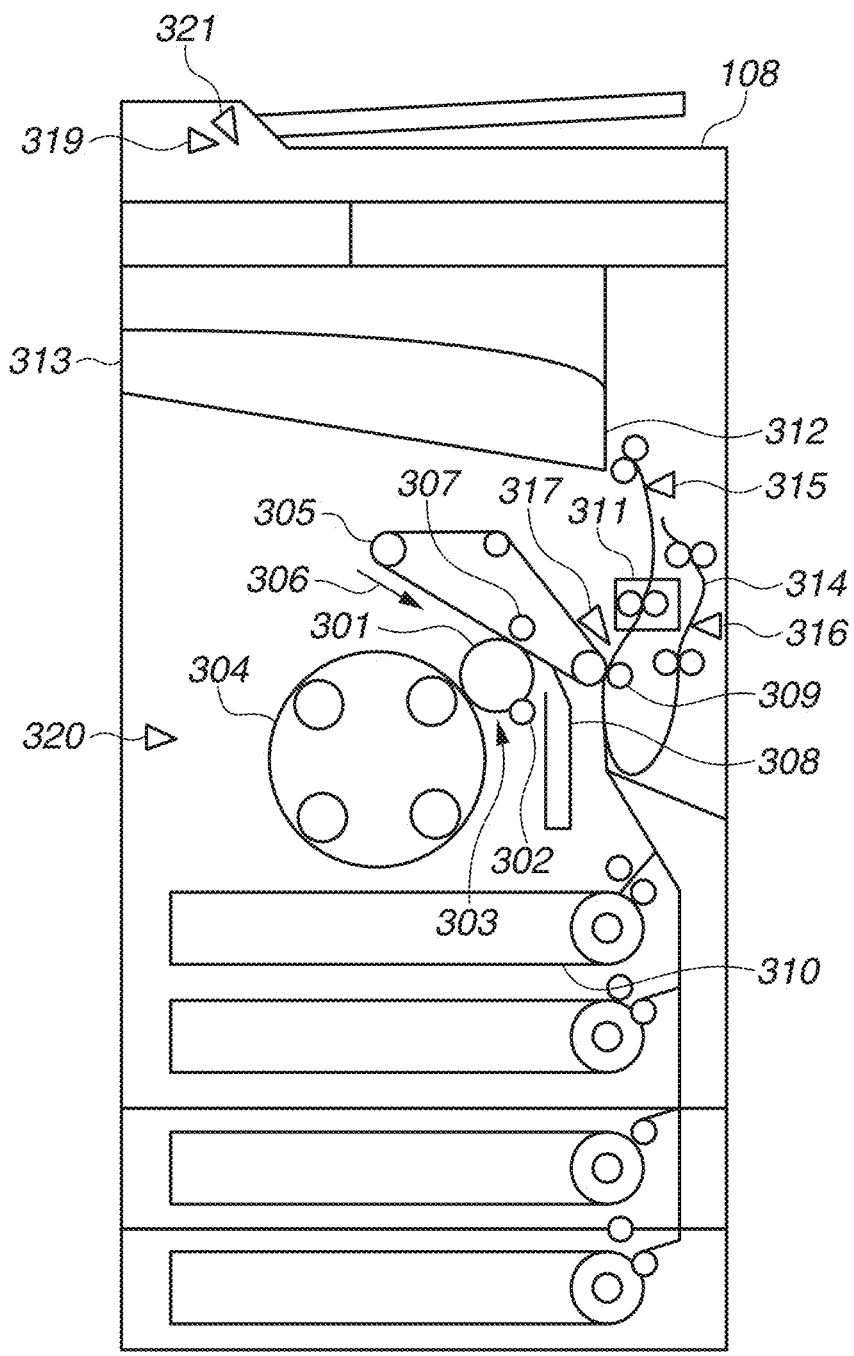
FIG. 3 is a cross-sectional view illustrating an internal structure of the image forming apparatus according to an exemplary embodiment of the present invention.

FIG. 3 is a cross-sectional view illustrating the internal structure of the image forming apparatus 100. FIG. 3 illustrates an example of the internal structure of a full-color image forming apparatus for cyan, magenta, yellow, and black (CMYK), for example.

A photosensitive drum 301 is charged to a particular polar potential by a primary charging device 302, and a position 303 is exposed with light by an exposure unit (not illustrated) according to an instruction from the CPU 101. In this manner, an electrostatic latent image corresponding to K, for example, is formed.

A rotary developing device 304 includes four developing devices integrated with toner cartridges. After the electrostatic latent image is formed, an image corresponding to K is developed on the photosensitive drum 301 by one of the developing devices of the rotary developing device 304.

An intermediate transfer belt 305 is driven in a direction 306. Then, in the process of passing through a contact portion between the photosensitive drum 301 and the intermediate transfer belt 305, the image corresponding to K developed on the photosensitive drum 301 is transferred onto the intermediate transfer belt 305 by an electric field formed by a primary transfer roller 307. The surface of the photosensitive drum 301 from which the image has been transferred onto the intermediate transfer belt 305 is cleaned by a cleaning device 308. This process is sequentially repeated to superimpose images of four colors (magenta, cyan, yellow, and black) on the intermediate transfer belt 305, thereby forming a color image. In a case where a monochromatic image is formed, a transfer process is performed only once.

In a portion of a secondary transfer roller 309, the image transferred onto the intermediate transfer belt 305 is printed on a sheet fed from a cassette 310. The sheet on which the image has been printed is heated by a fixing device 311, thereby fixing the image. After the image is fixed, the sheet is conveyed to a sheet discharge opening 313 by rollers 312 and discharged to outside of the image forming apparatus 100. In a case where two-sided printing is performed, the sheet is conveyed through a reverse path 314 so that the sheet is inverted, and a printing process is repeated. Further, the secondary transfer roller 309 and the fixing device 311 are included in a single unit termed a transfer unit, and this unit can be pulled out when jammed paper is removed.

A conveying unit sensor 315, a two-sided unit sensor 316, and a transfer unit sensor 317 each detect the presence or absence of the stagnation of a print sheet. Further, a reading unit sensor 321 detects the presence or absence of the stagnation of a document sheet in the scanner device 108. Each of these sensors detects the occurrence of a jam. When a document is read by the scanner device 108, a multi-feed detection sensor 319 detects whether a plurality of documents are conveyed in an overlapping manner (hereinafter, "multi-feed"). As the multi-feed detection sensor 319, a sensor using any method may be employed as long as the sensor can detect that, in a state where a preceding sheet that is being fed overlaps a following sheet, the following sheet is sent along with the preceding sheet. For example, a sensor for emitting an ultrasonic wave from one of sheet surfaces to detect a multi-feed state based on the attenuation characteristics of the waveform reaching the opposite side, or a sensor for measuring the electrical resistance in the thickness direction of a sheet to detect a multi-feed state can be used. A front cover lock sensor 320 detects whether the front cover 202 is locked (lock detection). These sensors may use mechanical flags, or may use optical elements.

Figure 4A:
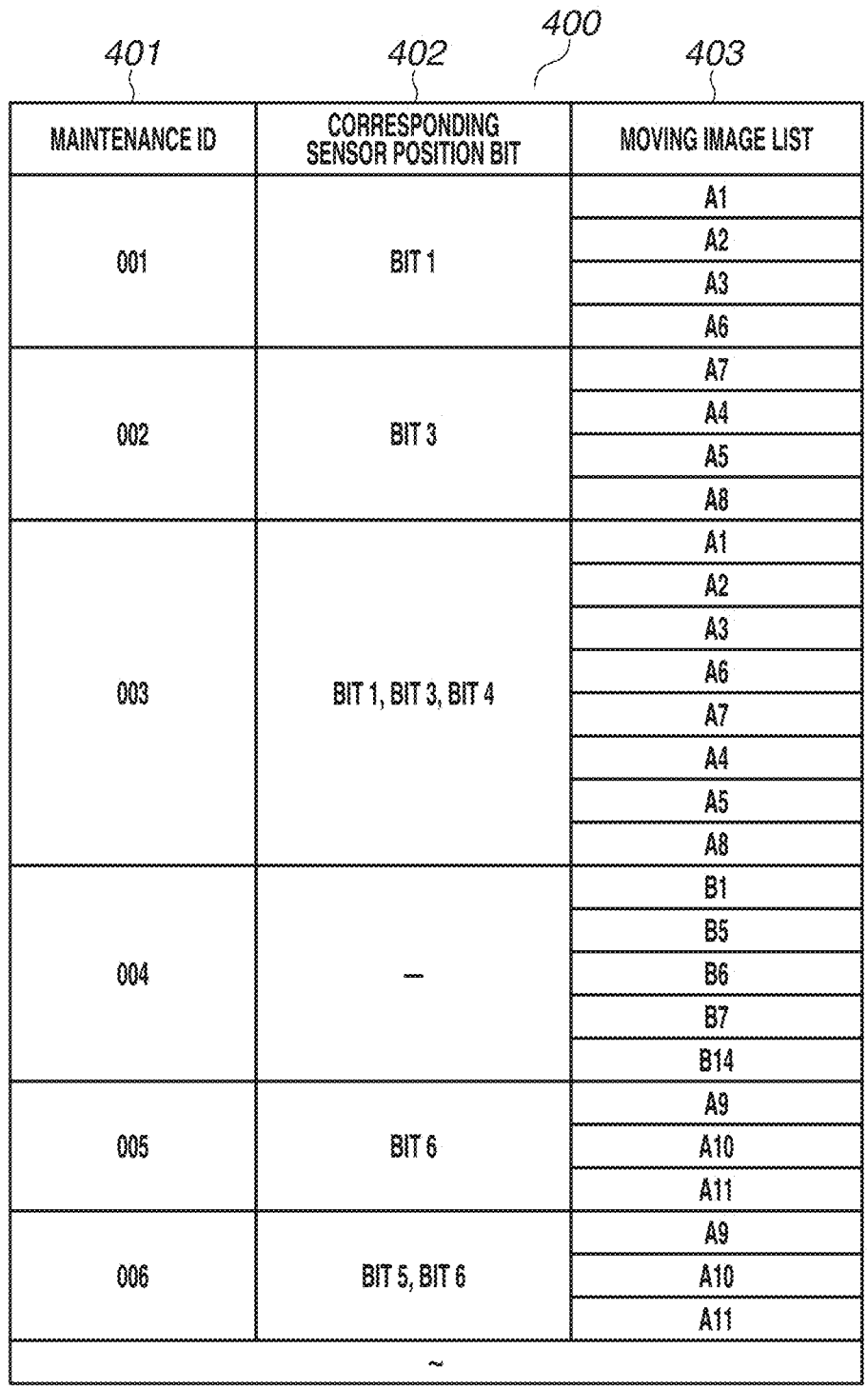

FIGS. 4A, 4B, and 4C are diagrams illustrating a moving image list table 400, a moving image table 410, and a sensor position bit table 420, respectively, which are stored in the storage 111 in FIG. 1.

FIG. 4C is a diagram illustrating the sensor position bit table 420. The sensor position bit table 420 is a table that associates a sensor 421 with a sensor position bit 422.

The sensor 421 indicates the position of a sensor within the image forming apparatus 100. The sensor position bit 422 indicates a place where, in a case where each of various sensors indicated by the sensor 421 detects the stagnation of a print sheet or a document sheet, a bit corresponding to the sensor is set to on.

In a case where the conveying unit sensor 315 detects a jam in a conveying unit, bit 1 is set to on.

In a case where the two-sided unit sensor 316 detects a jam in a two-sided unit, bit 2 is set to on.

In a case where the transfer unit sensor 317 detects a jam in a transfer unit, bit 3 is set to on.

In a case where the front cover lock sensor 320 detects that the front cover 202 is locked, bit 4 is set to on.

In a case where the multi-feed detection sensor 319 detects multi-feed, bit 5 is set to on.

In a case where the reading unit sensor 321 detects a jam in the scanner device 108, bit 6 is set to on.

FIG. 4A is a diagram illustrating the moving image list table 400. The moving image list table 400 defines the relation between a maintenance event (a jam or toner shortage) and a moving image to be played when the occurrence of the maintenance event is detected. In the moving image list table 400, a maintenance identification (ID) 401, a corresponding sensor position bit 402, and a moving image list 403 are stored in association with each other. The maintenance ID 401 is maintenance identification information for identifying a maintenance event occurring in the image forming apparatus 100.

In FIG. 4A, the numeral "001" of the maintenance ID 401 indicates a conveying unit jam, which is detected when only bit 1 (the conveying unit sensor 315) of the sensor position bit 422 is on. The numeral "002" indicates a transfer unit jam, which is detected when only bit 3 (the transfer unit sensor 317) of the sensor position bit 422 is on.

The numeral "003" indicates a conveying unit jam and a transfer unit jam, which are detected when bit 1 (the conveying unit sensor 315), bit 3 (the transfer unit sensor 317), and bit 4 (the front cover lock sensor 320) of the sensor position bit 422 are on. In a case where jammed paper is across the conveying unit and the transfer unit, and if the front cover 202 is opened and the transfer unit is pulled out, the jammed paper may be cut, and a part of the cut paper may remain in the conveying unit and the transfer unit, leading to a failure. To that end, in a case where a jam occurs across the conveying unit and the transfer unit, control is performed so as to lock the front cover 202 to prevent jammed paper from being cut by mistakenly pulling out the transfer unit. Thus, in a case where a jam in the conveying unit and the transfer unit is detected, the front cover 202 enters a locked state, and bit 4 of the sensor position bit 422 is set to on.

The numeral "004" indicates cyan toner shortage, which is detected by the printer device 106.

The numeral "005" indicates a reading unit jam, which is detected when only bit 6 of the sensor position bit 422 is on.

The numeral "006" indicates a reading unit multi-feed detection jam, which is detected when bits 5 and 6 of the sensor position bit 422 are on.

The moving image list 403 indicates a list of moving images to be played when a maintenance event occurs. In a case where a maintenance event occurs, it is necessary to represent to the user a series of works required to remove the maintenance event. The series of works includes a plurality of works such as the work for opening a cover, the work for removing jammed paper, and the work for closing the cover. In the present exemplary embodiment, a single moving image representing a series of works is not prepared for each maintenance event, but a moving image is prepared for each work content (operation element), and a plurality of these moving images are combined to represent a series of works to the user. In the following description, a moving image for each work is referred to as a "partial moving image". In the moving image list 403, the combination of a plurality of partial moving images and the play order of the partial moving images are stored in association with the maintenance ID 401. For example, if the maintenance ID 401 is 001, the combination of partial moving images is partial moving images A1, A2, A3, and A6, which are indicated by the moving image list 403 corresponding to 001. Further, the play order is the order of description. Thus, if the maintenance ID 401 is 001, the partial moving images A1, A2, A3, and A6 are played in this order.

FIG. 4B is a diagram illustrating the moving image table 410. The moving image table 410 associates a moving image ID 411, a moving image file 412, a play time 413, a cover open/close flag 414, and a message 415 with each other.

The moving image ID 411 is an ID for identifying a partial moving image and is also used in the moving image list 403 in the moving image list table 400. The moving image file 412 indicates the file name of a partial moving image to be played and the location of the partial moving image file in the storage 111. In this case, the partial moving image file is stored in the storage 111. Alternatively, the configuration may be such that the partial moving image file is stored in a server connected to the image forming apparatus 100 via a network, or stored in an external apparatus such as a storage device connected to the image forming apparatus 100 via a Universal Serial Bus (USB) cable, and is read when needed.

The play time 413 indicates the play time from the start to the end of the play of a partial moving image.

The cover open/close flag 414 indicates whether a partial moving image is a partial moving image representing a procedure before a cover of the image forming apparatus 100 is opened, or a partial moving image representing a procedure after a cover of the image forming apparatus 100 is opened. If the cover open/close flag 414 is "0", it is indicated that the partial moving image is a moving image representing a procedure before a cover is opened. If the cover open/close flag 414 is "1", it is indicated that the partial moving image is a moving image representing a procedure after a cover is opened.

The message 415 indicates a message to be displayed while a corresponding partial moving image is played.

A work content indicated by each partial moving image file is as follows.

A partial moving image A1 represents a work for opening the right cover 201.

Partial moving images A2 and A3 represent works for removing jammed paper near the conveying unit sensor 315. Partial moving images A4 and A5 represent works for removing jammed paper near the transfer unit sensor 317.

A partial moving image A6 represents a work for closing the right cover 201.

A partial moving image A7 represents a work for opening the front cover 202.

A partial moving image A8 represents a work for closing the front cover 202.

A partial moving image A9 represents a work for opening a cover of the scanner device 108. A partial moving image A10 represents a work for removing jammed paper near the reading unit sensor 321. A partial moving image A11 represents a work for closing the cover of the scanner device 108.

A partial moving image B1 represents a work for opening the toner cover 203. A partial moving image B2 represents a work for taking out an empty magenta toner cartridge. A partial moving image B3 represents a work for preparing a new magenta toner cartridge. A partial moving image B4 represents a work for attaching a new magenta toner cartridge.

A partial moving image B5 represents a work for taking out an empty cyan toner cartridge. A partial moving image B6 represents a work for preparing a new cyan toner cartridge. A partial moving image B7 represents a work for attaching a new cyan toner cartridge.

A partial moving image B8 represents a work for taking out an empty yellow toner cartridge. A partial moving image B9 represents a work for preparing a new yellow toner cartridge. A partial moving image B10 represents a work for attaching a new yellow toner cartridge.

A partial moving image B11 represents a work for taking out an empty black toner cartridge. A partial moving image B12 represents a work for preparing a new black toner cartridge. A partial moving image B13 represents a work for attaching a new black toner cartridge.

A partial moving image B14 represents a work for closing the toner cover 203.

Referring back to the moving image list 403 in FIG. 4A, for example, in a case where a conveying unit jam occurs (the maintenance ID 401 is 001), first, the partial moving image A1, which represents the work for opening the right cover 201, is played. Second, the partial moving images A2 and A3, which represent the works for removing jammed paper near the conveying unit sensor 315, and the partial moving image A6, which represents the work for closing the right cover 201, are played in this order. At this time, works for removing a conveying unit jam, which is a maintenance event, are represented by the partial moving images A2 and A3. Thus, it can be said that the partial moving image A1 represents a work for the preparation of these works. In the following description, a partial moving image representing a work to be performed before a procedure for solving a maintenance event is referred to as an "advance preparation moving image". Further, a partial moving image representing a work for solving a maintenance event, i.e., a work to be performed after a work represented by an advance preparation moving image is performed, is referred to as a "main content moving image". For example, if the maintenance ID 401 is 001, the partial moving image A1 is an advance preparation moving image, and the partial moving images A2, A3, and A6 are main content moving images. If the maintenance ID 401 is 004, the partial moving image B1 is an advance preparation moving image, and the partial moving images B5, B6, B7, and B14 are main content moving images. In the present exemplary embodiment, a partial moving image of which the cover open/close flag 414 is 0 is an advance preparation moving image. A partial moving image of which the cover open/close flag 414 is 1 is a main content moving image.

FIGS. 5A, 5B, 5C, 6A, 6B, 6C, 7A, and 7B are diagrams illustrating examples of screens displayed on the display device 115 according to the present exemplary embodiment. With reference to FIGS. 5A, 5B, 5C, 6A, 6B, 6C, 7A, and 7B, the overall picture of the transition of a display screen according to the present exemplary embodiment is described below.

Figure 5A:
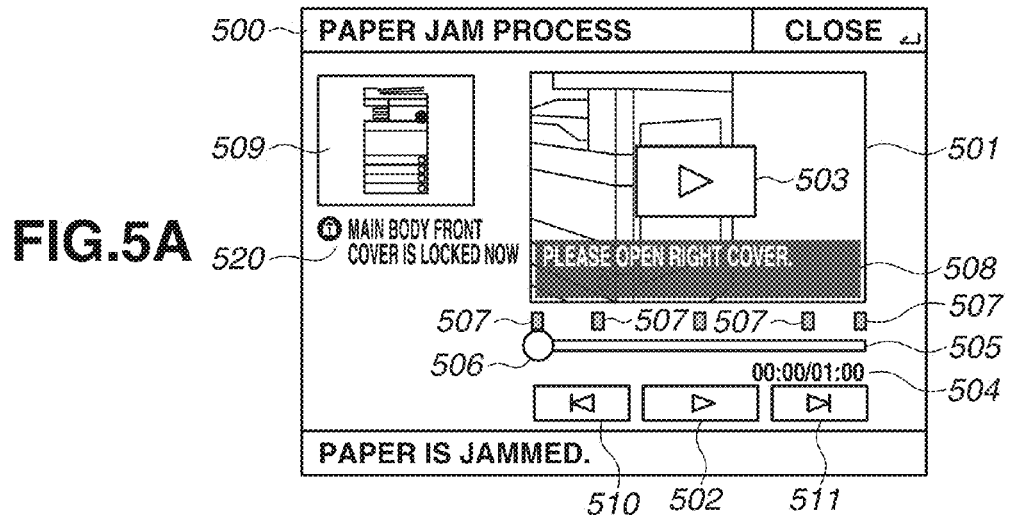
FIGS. 5A, 5B, and 5C are diagrams illustrating examples of screens on a display device according to an exemplary embodiment of the present invention.
Figure 5B:
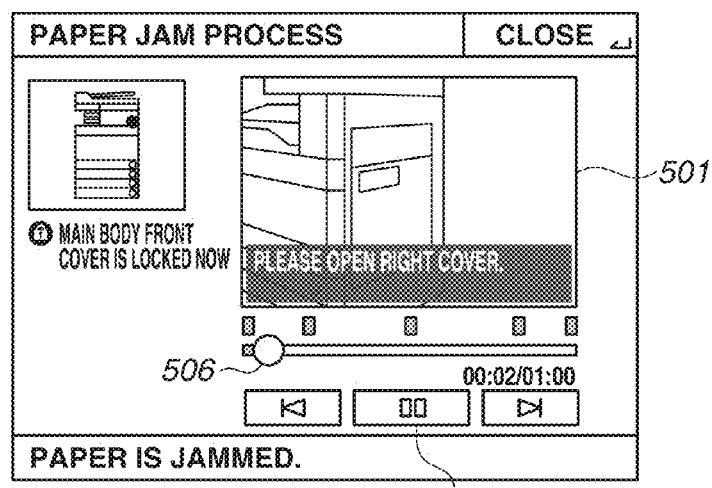
Figure 5C:
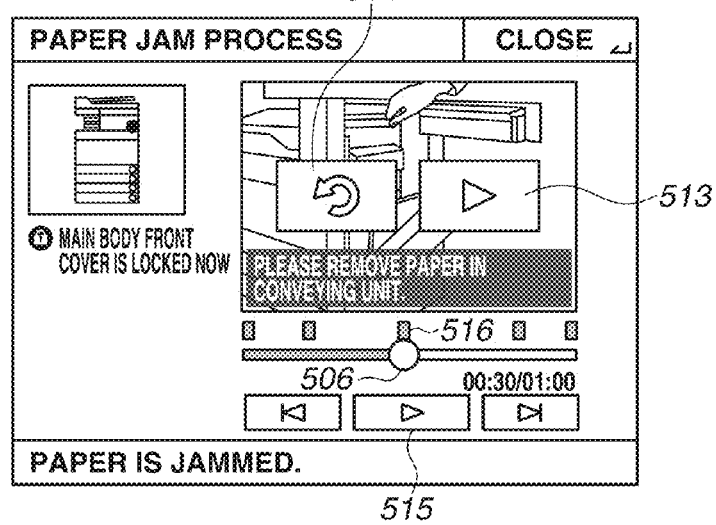

In FIGS. 5A, 5B, and 5C, a screen 500 is displayed on the display device 115 via the display control unit 114 by the CPU 101 executing a program stored in the storage 111 to generate display data.

FIG. 5A illustrates an example of a screen displayed when the occurrence of a maintenance event is detected. Here, a description is given taking as an example a case where the occurrence of a conveying unit jam is detected (the maintenance ID 401 is 001). In a case where the maintenance ID 401 is 001, then according to the moving image list table 400, partial moving images of which the moving image IDs 411 are A1, A2, A3, and A6 are played in order. In FIG. 5A, a screen is displayed in the state where the partial moving image A1, which is an advance preparation moving image, is stopped at its beginning.

On the screen 500, a moving image display area 501, a play button 502, a play mark 503, a play time display label 504, a bar 505, a slider 506, chapters 507, a message area 508, and an icon 509 are displayed. Further, a chapter skip back button 510 and a chapter skip forward button 511 for moving a play position to the chapters 507 are displayed.

The moving image display area 501 is an area for displaying a moving image representing maintenance procedures. The play button 502 is a button for giving an instruction to reproduce the moving image. The play mark 503 is a mark for giving an instruction to reproduce the moving image, as in the play button 502. In a case where the play button 502 or the play mark 503 is pressed (touched), the CPU 101 starts the play of the moving image.

The play time display label 504 indicates the sum of the play times of a plurality of partial moving images to be played (referred to as a "total play time"), and a time corresponding to the current play position relative to the total play time.

The bar 505 and the slider 506 forms a seek bar indicating the play position in the entirety of the moving image and also for giving an instruction to move the play position. The bar 505 schematically indicates the total play time. The slider 506 indicates the current play position and is also used to give an instruction to move the play position. The slider 506 moves in the range of the bar 505 according to the play state of the moving image. Further, the play position can be moved to any position by dragging (moving) the slider 506. Further, if any position on the bar 505 is pressed, the play of the moving image can be advanced to the pressed position, and the slider 506 also moves along with the play position. The chapters 507 indicate the positions of breaks in the moving image. When the moving image is played to any of these positions, the moving image is automatically stopped.

The play time display label 504 and the chapters 507 are specifically described. In a case where the maintenance ID 401 is 001, then according to the moving image list table 400, the partial moving images A1, A2, A3, and A6 are played in order. According to the moving image table 410, the play times of these partial moving images are 10 seconds (00:10), 20 seconds (00:20), 20 seconds (00:20), and 10 seconds (00:10), respectively. The total play time is the sum of the play times of partial moving images to be played. Thus, in this case, the total play time is 1 minute and 00 seconds (01:00). The play time indicates the current play position relative to the total play time. For example, suppose that a scene after 5 seconds (00:05) from the beginning of the partial moving image A1, which is played first, is being displayed. In this case, the play time is 5 seconds as it is. Further, suppose that a scene after 10 seconds from the beginning of the partial moving image A2, which is played second, is being displayed. In this case, since the play of the partial moving image A1 is finished, the play time is 20 seconds (00:20), which is obtained by adding together 10 seconds, which is the play time of the partial moving image A1, and 10 seconds, which is the time of the played part of the partial moving image A2. The play time display label 504 is displayed as a character string obtained by connecting the thus calculated play time and total play time by a slash (/).

The chapters 507 are displayed at the positions of breaks in the series of works. When the moving image is played to any of these positions, the play of the moving image is automatically paused. The chapters 507 are displayed at three positions where the play of the partial moving images is switched (between A1 and A2, between A2 and A3, and between A3 and A6). Further, the chapters 507 may also be displayed at two positions at the beginning and the end of the entirety of the moving image.

FIG. 5A illustrates an example of a case where the chapters 507 are displayed at the above five positions.

The chapter skip back button 510 and the chapter skip forward button 511 are buttons for moving the play position of the moving image to the chapters 507. For example, in a case where the chapter skip forward button 511 is pressed in the state where the play time is 00:00, the play position and the slider 506 are moved to the chapter 507 at the play time "00:10". Further, if the chapter skip back button 510 is pressed in the state where the play time is 01:00, the play position and the slider 506 are moved to the chapter 507 at the play time "00:50".

In the message area 508, a message for supplementing the content of a partial moving image that is being played is displayed. More specifically, when the partial moving image A1 is being played, a message "Please open right cover." is displayed based on the message 415 in the moving image table 410. The message area 508 may be hidden after a certain time from the start of the play of the corresponding partial moving image, or may continue to be displayed while the corresponding partial moving image is displayed.

The icon 509 indicates the place where a maintenance event is occurring in the image forming apparatus 100. More specifically, in a case where the maintenance ID 401 is 001, a conveying unit jam is occurring. Thus, the conveying unit in indicated in the icon 509.

As a message 520, when the front cover lock sensor 320 detects that the front cover 202 is locked, a message notifying the user that the front cover 202 is locked is displayed.

If the play button 502 or the play mark 503 is pressed on the screen in FIG. 5A, the play of the moving image is started. If the maintenance ID 401 is 001, the CPU 101 starts the play of the partial moving image A1, which is an advance preparation moving image. FIG. 5B illustrates an example of a screen after 2 seconds from the start of the play of the partial moving image A1. In response to the start of the play of the moving image, the play button 502 and the play mark 503 are hidden, and in place of the play button 502, a pause button 512 is displayed at the same position.

FIG. 5C is a diagram illustrating an example of a screen when the play position reaches the end of the partial moving image A2. When the play of the partial moving image A2 ends, i.e., at the position of a chapter 516, the play of the moving image is automatically paused. Then, a replay mark 514 is displayed together with a play mark 513. Further, the pause button 512 is hidden, and a play button 515 is displayed at the same display position. The replay mark 514 is a mark for giving an instruction to reproduce a partial moving image that is currently stopped, from its beginning. More specifically, if the replay mark 514 is pressed while the partial moving image A2 is stopped at the position of the chapter 516, the CPU 101 moves to the beginning of the partial moving image A2 and resumes the play of the moving image. As described above, chapters are placed on a work-by-work basis, and when the play of a moving image to each of the chapters ends, the play is automatically paused, whereby it is possible to prevent the moving image from, regardless of the user's intention, proceeding to a partial moving image representing the subsequent work. Further, when the moving image is paused, the replay mark 514 is displayed together with the play mark 513. Thus, the user can easily select whether to proceed to a partial moving image representing the next operating procedure or review the moving image once again.

In a case where the play mark 513 or the play button 515 is pressed on the screen in FIG. 5C, the play of the partial moving image A3 is started.

Figure 6A:
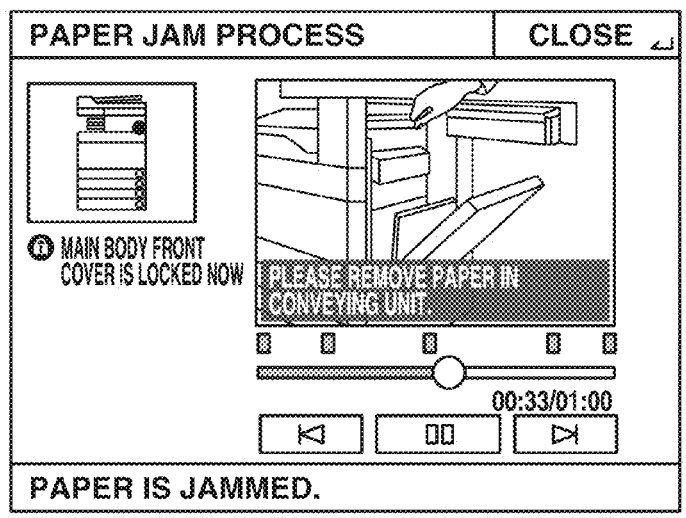
FIGS. 6A, 6B, and 6C are diagrams illustrating examples of screens on the display device according to an exemplary embodiment of the present invention.

FIG. 6A is a diagram illustrating an example of a screen after 3 seconds from the start of the play of the partial moving image A3.

Figure 6B:
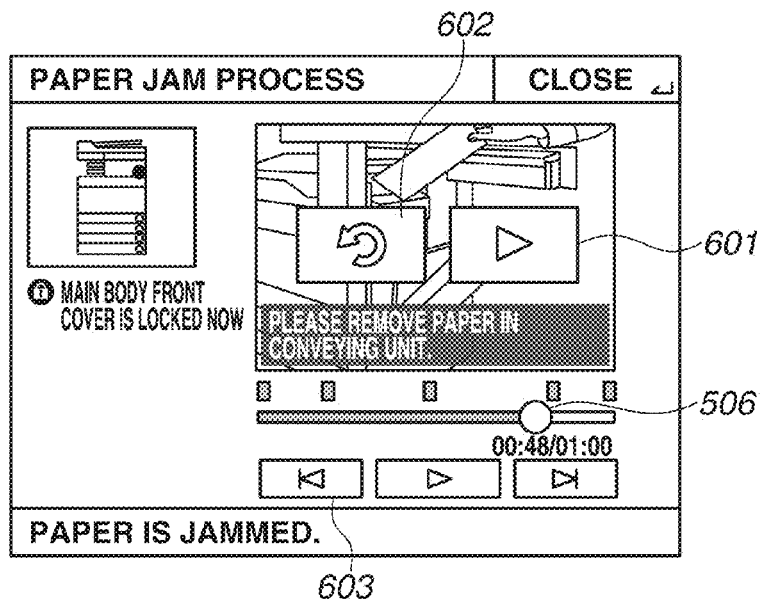

FIG. 6B is a diagram illustrating an example of a screen when a pause button or a moving image display area is pressed in the middle of the play of the partial moving image A3. In a case where the pause button or the moving image display area is pressed, the play of the moving image is stopped, and a replay mark 602 is displayed together with a play mark 601.

Figure 6C:
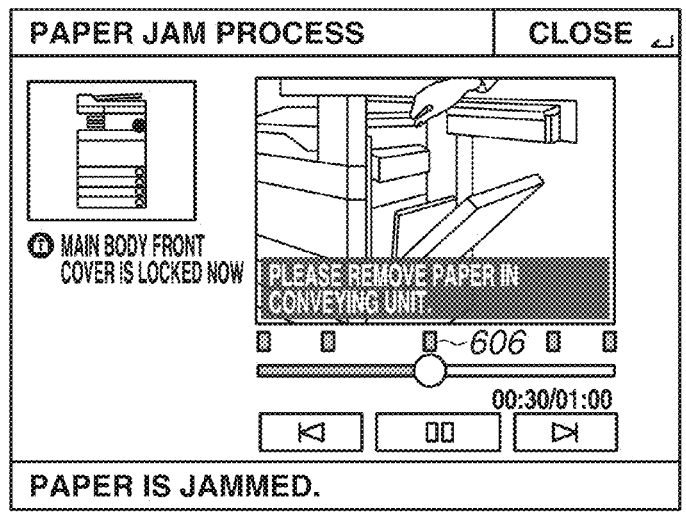

FIG. 6C is a diagram illustrating an example of a screen displayed when the replay mark 602 or a chapter skip back button 603 on the screen in FIG. 6B is pressed. If the replay mark 602 or the chapter skip back button 603 is pressed, the play position is moved to the beginning (a chapter 606) of the partial moving image A3, and the play of the moving image is resumed.

As described above, also in a case where the moving image has paused by an intentional operation of the user, a replay mark is displayed together with a play mark, as in the case where the moving image is automatically paused based on the end of the play of a partial moving image.

Figure 7A:
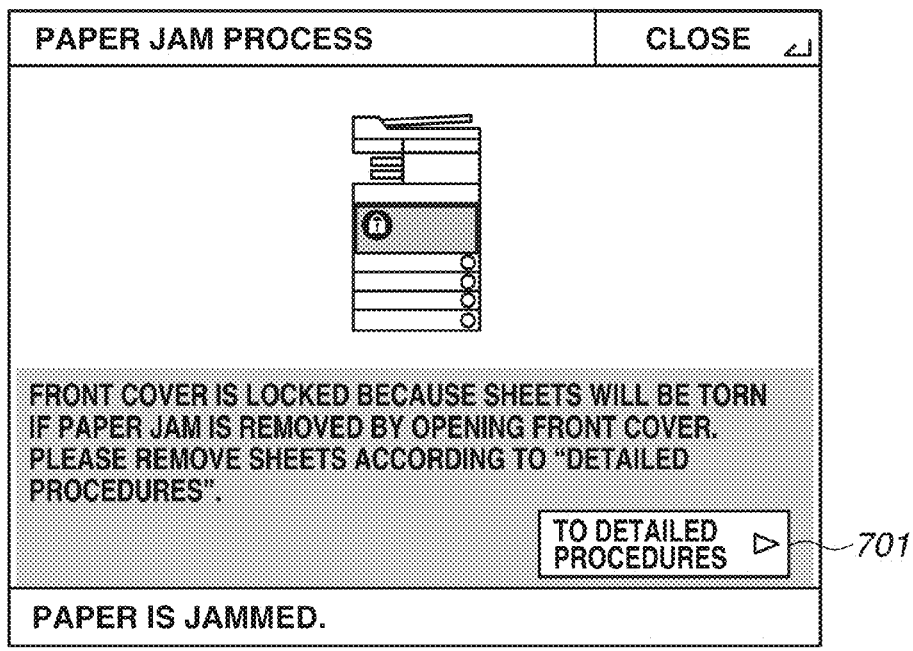
FIGS. 7A and 7B are diagrams illustrating examples of screens on the display device according to an exemplary embodiment of the present invention.
Figure 7B:
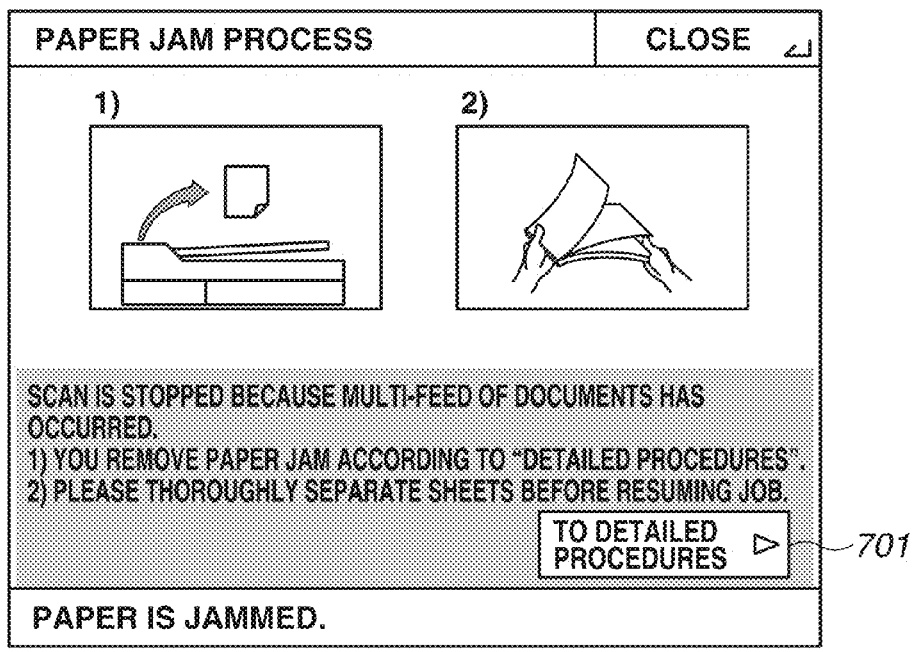

FIGS. 7A and 7B are diagrams illustrating examples of dedicated screens displayed before a moving image representing detailed maintenance procedures (FIGS. 5A, 5B, 5C, 6A, 6B, and 6C) is displayed in a case where a particular maintenance event occurs.

FIG. 7A is a diagram illustrating an example of a screen displayed first when the maintenance ID 401 is 003, i.e., a conveying unit jam and a transfer unit jam occur and the front cover 202 is locked. As described above, in a case where a jam occurs across the conveying unit and the transfer unit, control is performed so as to lock the front cover 202 to prevent jammed paper from being cut by mistakenly pulling out the transfer unit. If, however, the user attempts to forcibly open the front cover 202 without being aware of the locking of the front cover 202, this leads to the failure of the front cover 202. To that end, in a case where a jam occurs, the screen illustrated in FIG. 7A is displayed before detailed procedures are displayed as in FIGS. 5A, 5B, and 5C and FIGS. 6A, 6B, and 6C, whereby it is possible to call the user's attention to the fact that the front cover 202 is locked.

A "to detailed procedures" button 701 is a button for switching display to a moving image representing procedures for removing jammed paper as in FIGS. 5A, 5B, and 5C and FIGS. 6A, 6B, and 6C.

FIG. 7B is a diagram illustrating an example of a screen displayed first in a case where the maintenance ID 401 is 006, i.e., multi-feed of documents occurs when the document conveying device 109 reads a document, and then, a jam occurs. When multi-feed occurs, a plurality of documents may be stuck together. Thus, if the reading of a document is resumed in the same state after a jam is removed, there is a possibility that multi-feed will occur again. Then, as in the example of the screen in FIG. 7B, a method for eliminating this possibility (separating of sheets from one another before the reading of a document is resumed) is represented to the user, whereby it is possible to prevent the recurrence of multi-feed.

Figure 8:
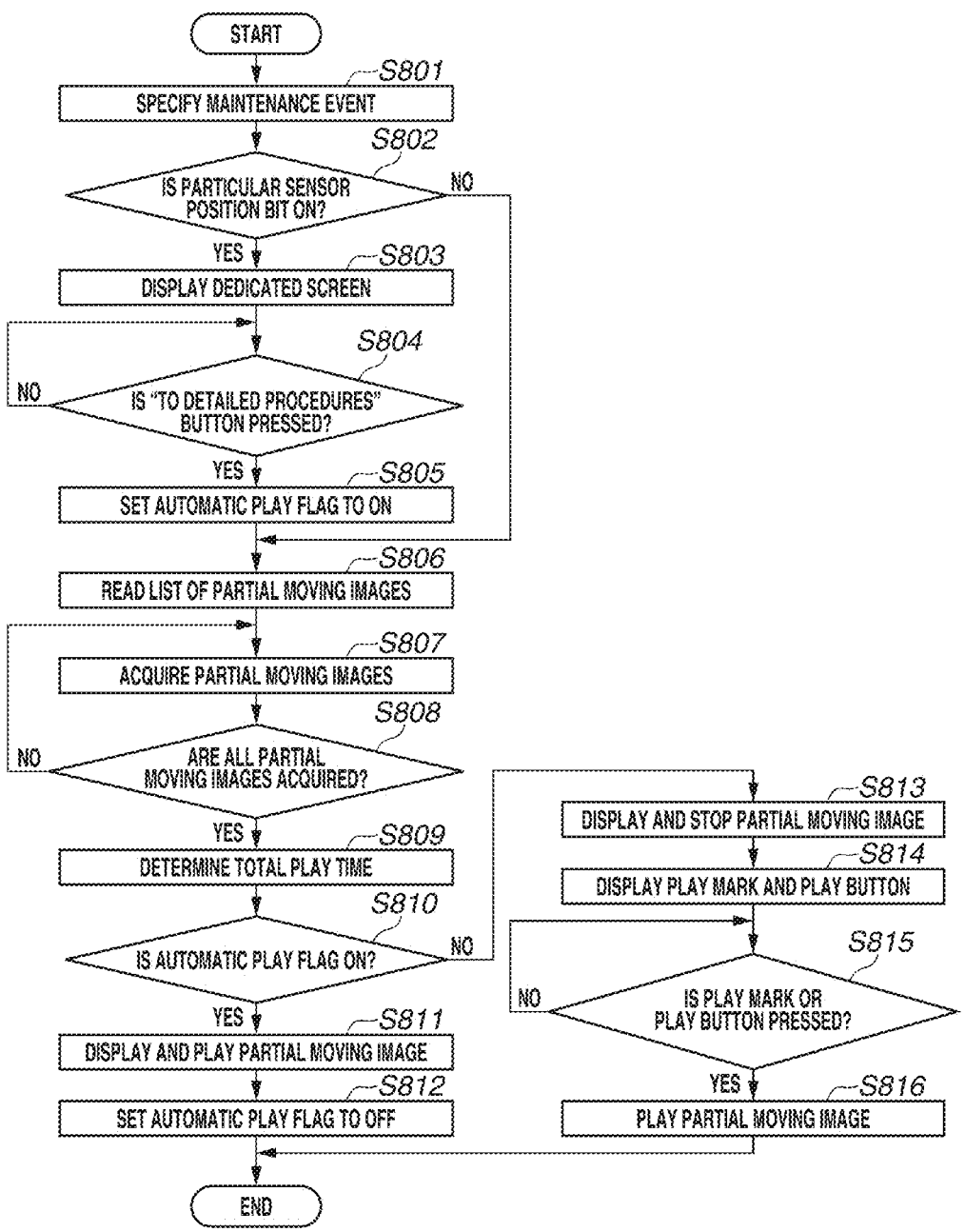
FIG. 8 is a flowchart illustrating a processing procedure according to a first exemplary embodiment of the present invention.

FIG. 8 is a flowchart illustrating the process of displaying maintenance procedures, which is executed by the CPU 101.

The processing in FIG. 8 is started by the printer control unit 105 or the image reading control unit 107 detecting a change in a value indicated by the corresponding one of the above various sensors.

In step S801, the CPU 101 determines whether any one of maintenance events occurs, and then specifies the maintenance ID 401 of the maintenance event. For example, in a case where a jam occurs near the conveying unit sensor 315, only bit 1 of the sensor position bit 422 is on. Thus, according to the moving image list table 400 in FIG. 4A, the CPU 101 specifies the maintenance ID 401 as 001 (a conveying unit jam). Further, in a case where a jam occurs at a position across the conveying unit and the transfer unit, bits 1, 3, and 4 of the sensor position bit 422 are on. Thus, the CPU 101 specifies the maintenance ID 401 as 003 (a conveying unit/transfer unit jam).

Next, in step S802, the CPU 101 determines whether a particular sensor position bit is on. The "particular sensor position bit" as used herein refers to bit 4 (the front cover lock sensor 320) and bit 5 (the multi-feed detection sensor 319). If either of these sensor position bits is on (YES in step S802), the processing proceeds to step S803. If neither of these sensor position bits is on (NO in step S802), the processing proceeds to step S806.

If a particular sensor position bit is on (YES in step S802), then in step S803, the CPU 101 outputs to the display device 115 a dedicated screen for calling the user's attention as illustrated in FIG. 7A or 7B. If bit 4 is on, the screen illustrated in FIG. 7A is output to the display device 115. If bit 5 is on, the screen illustrated in FIG. 7B is output to the display device 115.

Next, in step S804, the CPU 101 determines whether the pressing of the "to detailed procedures" button 701 is detected. If the pressing of the "to detailed procedures" button 701 is detected (YES in step S804), then in step S805, the CPU 101 sets an automatic play flag to on and stores the set automatic play flag in the RAM 104.

In step S806, the CPU 101 references the moving image list table 400 and reads a list of partial moving images corresponding to the maintenance ID 401 specified in step S801. Then, in step S807, the CPU 101 acquires partial moving images according to the read list of partial moving images. For example, if the specified maintenance ID 401 is 001, the partial moving images A1, A2, A3, and A6 are to be played. If the specified maintenance ID 401 is 003, the partial moving images A1, A2, A3, A6, A7, A4, A5, and A8 are to be played. The CPU 101 temporarily stores in the RAM 104 the plurality of specified partial moving images in the play order of the specified partial moving images as, for example, sequence information.

In step S808, the CPU 101 determines whether all the partial moving images in the list read in step S806 are acquired. If all the partial moving images are acquired (YES in step S808), the processing proceeds to step S809. If not all the partial moving images are acquired (NO in step S808), the processing proceeds to step S807.

Next, in step S809, the CPU 101 calculates the total play time of a moving image. The CPU 101 acquires the play time 413 of each of the partial moving images acquired in step S807 based on the moving image table 410, and calculates the total sum of the acquired play times. The CPU 101 displays a play time display label (504 in FIG. 5A) based on the calculated total play time.

In step S810, the CPU 101 determines whether the automatic play flag stored in the RAM 104 is on. If the automatic play flag is on (YES in step S810), the processing proceeds to step S811. If the automatic play flag is not on (NO in step S810), the processing proceeds to step S813.

If the automatic play flag is off (NO in step S810), then in step S813, the CPU 101 loads the partial moving image having the moving image ID 411 at the front into the RAM 104 and outputs the partial moving image in a stopped state to the display device 115. For example, if the maintenance ID 401 is 001, the CPU 101 loads the partial moving image A1 at the front into the RAM 104 and outputs the partial moving image A1 in a stopped state to the display device 115. Additionally, in step S814, the CPU 101 outputs a play mark and a play button to the display device 115. FIG. 5A is an example of a screen at this time. In step S815, if the CPU 101 detects that the play button 502 or the play mark 503 is pressed by the user (YES in step S815), then in step S816, the CPU 101 starts the play of the partial moving image at the front. A maintenance event such as the occurrence of a jam may occur at any time while the image forming apparatus 100 is executing a scan operation or a print operation. However, when the maintenance event occurs, the user is not necessarily viewing the display device 115. Thus, in a case where, based on the occurrence of a maintenance event, the current screen transitions to a screen for a moving image representing maintenance procedures, the play of the moving image is not automatically started, and after the operation of starting play is received from the user, the play of the moving image is started. Consequently, it is possible to prevent the user from missing viewing a procedure.

If, on the other hand, the automatic play flag is on (YES in step S810), in step S811, the CPU 101 loads the partial moving image having the moving image ID 411 at the front into the RAM 104 and outputs the partial moving image in a played state to the display device 115. For example, if the maintenance ID 401 is 003, the CPU 101 loads the partial moving image A1 at the front into the RAM 104 and starts the play of the partial moving image A1. After starting the play of the moving image, in step S812, the CPU 101 sets the automatic play flag to off. As described above, when a maintenance event occurs, the user is not necessarily viewing the display device 115. If, however, the "to detailed procedures" button 701 is pressed while the screen as in FIG. 7A or 7B is displayed, this means that the user is operating the display device 115 while viewing the display device 115. If the user is caused to perform the operation of starting the play of the moving image even in such a case, the number of operation steps increase, degrading the operability. Thus, after the screen illustrated in FIG. 7A or 7B is displayed based on the occurrence of a particular maintenance event, and if the screen transitions to a screen for a moving image representing maintenance procedures based on the operation of the user, the play of the moving image is automatically started. Consequently, it is possible to save the user the trouble of performing the operation of pressing the play button 502 or the play mark 503 to reproduce the moving image after the operation of pressing the "to detailed procedures" button 701.

In step S809, the CPU 101 calculates the total play time using the play time 413 in the moving image table 410. Alternatively, the CPU 101 may not use the play time 413. In other words, the CPU 101 may load a plurality of corresponding partial moving images into the RAM 104, calculate the play time of each of the partial moving images from the frame rate and the total number of frames of the partial moving image, and calculate the total play time from the value of the calculated play time.

Further, the format and the codec of a moving image are not particularly limited by the present invention and can take various forms.

As described above, in a case where the occurrence of a particular maintenance event among a plurality of maintenance events is detected, an image forming apparatus according to the present exemplary embodiment displays a particular screen for calling the user's attention, before displaying a moving image representing detailed maintenance procedures. This configuration prevents an act leading to the failure of the image forming apparatus 100 and the recurrence of a maintenance event.

Further, if a maintenance event other than the above particular maintenance event occurs, a moving image is displayed in a stopped state, and after the operation of starting play is received from the user, the play of the moving image is started. Consequently, it is possible to prevent the user from missing viewing of a procedure due to the fact that the play of a moving image representing maintenance procedures is automatically started based on the occurrence of a maintenance event. Further, after the above particular screen is displayed based on the detection of the above particular maintenance event, and in a case where the particular screen transitions to a screen for a moving image representing maintenance procedures based on the operation of the user, the play of the moving image is automatically started. This configuration prevents the operability for the user from being degraded due to the fact that a moving image is displayed uniformly in a stopped state when screen transition is performed.

Next, a second exemplary embodiment for carrying out the present invention is described focusing on the difference from the first exemplary embodiment. In the present exemplary embodiment, an example is described where, in a case where a cover related to a maintenance event is opened with a dedicated screen being displayed, the play position is moved to a moving image representing a procedure after the cover is opened, and the play of the moving image is automatically started.

Figure 9:
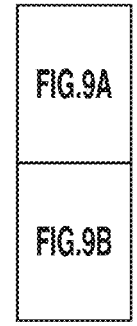
FIG. 9 (consisting of FIGS. 9A and 9B) is a flowchart illustrating a processing procedure according to a second exemplary embodiment of the present invention.
Figure 9A:
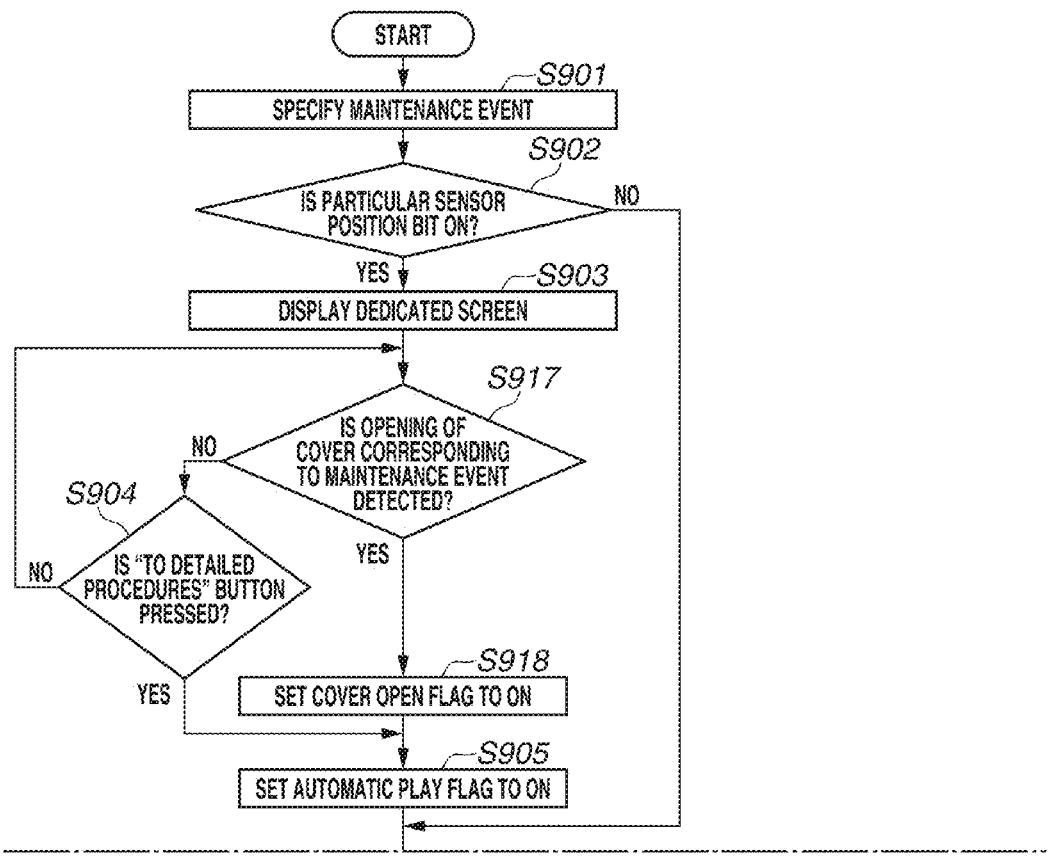
Figure 9B:
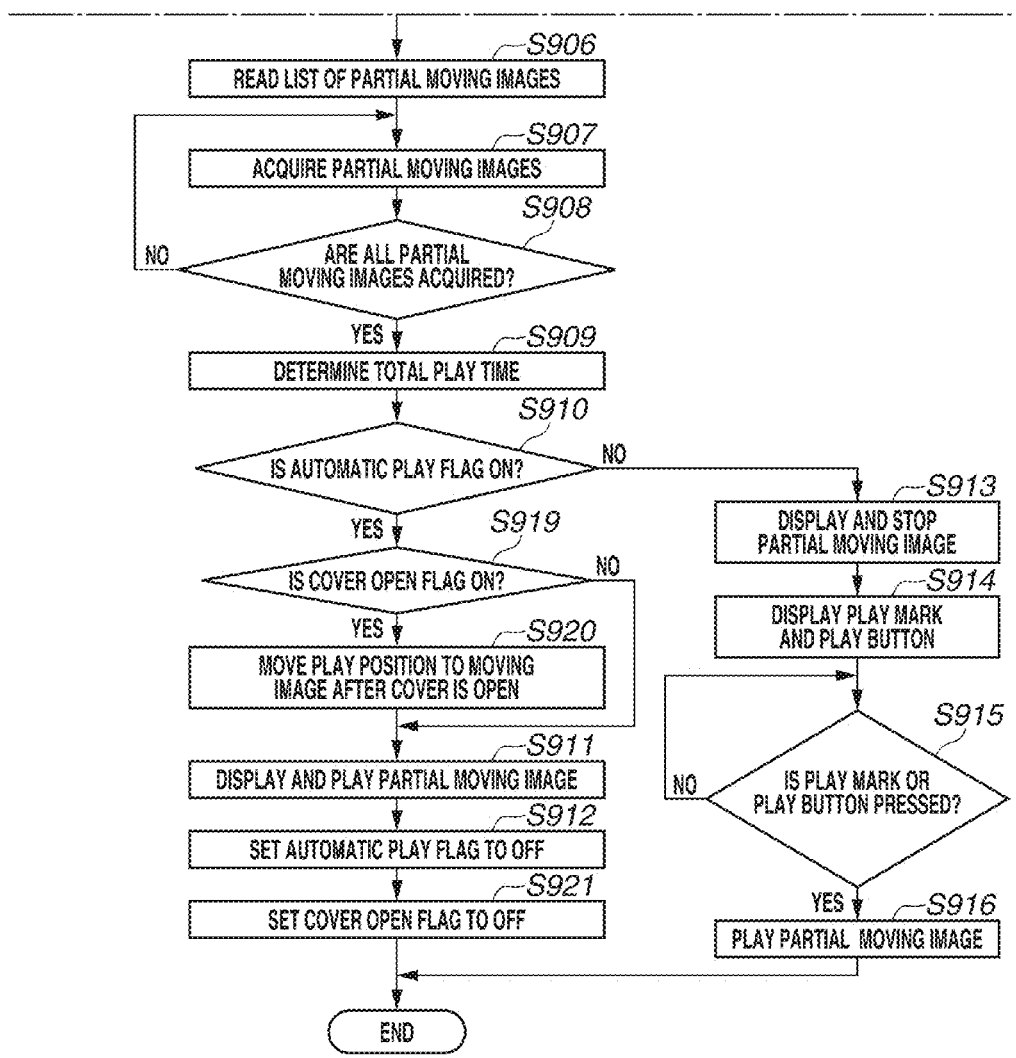

FIG. 9 is a flowchart illustrating the process of displaying maintenance procedures, which is executed by the CPU 101.

Steps S901 to S916 are similar to steps S801 to S816 in FIG. 8 and thus descriptions thereof are not omitted.

After the dedicated screen is displayed in step S903, in step S917, the CPU 101 determines whether a cover corresponding to the maintenance event that is currently occurring is opened. For example, if an event of which the maintenance ID 401 is 003 (a conveying unit jam and a transfer unit jam) occurs, then according to the moving image list table 400, a moving image to be displayed first is the partial moving image A1, which represents the work for opening the right cover 201. Thus, the CPU 101 examines the sensor for the right cover 201 and determines whether the right cover 201 is opened. If it is determined that a corresponding cover is opened (YES in step S917), in step S918, the CPU 101 sets a cover open flag to on and stores the set cover open flag in the RAM 104. If it is determined that a corresponding cover is not opened (NO in step S917), in step S904, the CPU 101 determines whether the "to detailed procedures" button 701 is pressed. In this manner, if a corresponding cover is opened or the "to detailed procedures" button 701 is pressed while the dedicated screen is being displayed, the processing proceeds to steps S905 and the steps subsequent thereto.

If it is determined in step S910 that the automatic play flag is on (YES in step S910), then in step S919, the CPU 101 determines whether the cover open flag stored in the RAM 104 is on. If the cover open flag is on (YES in step S919), the processing proceeds to step S920. If the cover open flag is not on (NO in step S919), the processing proceeds to step S911.

In step S920, according to the cover open/close flag 414, the CPU 101 moves the play position of the moving image to the beginning of a group of moving image IDs after the cover is opened. For example, if the maintenance ID 401 is 003, according to the moving image list table 400, the beginning of the group of moving image IDs after the cover is opened is the partial moving image A2. Thus, the CPU 101 moves the play position of the moving image to the beginning of the partial moving image A2. Then, in step S911, the play of the moving image is started from the partial moving image A2. In step S921, the CPU 101 sets the cover open flag to off and stores the set cover open flag in the RAM 104.

As described above, the image forming apparatus 100 according to the present exemplary embodiment displays a particular screen based on the detection of a particular maintenance event, and, in a case where the image forming apparatus 100 detects that a cover related to the maintenance event is opened, causes the particular screen to automatically transition to a screen for a moving image representing detailed procedures. As described above, when a maintenance event occurs, the user is not necessarily viewing the display device 115. If, on the other hand, a cover related to a maintenance event is opened, it is assumed that the user views the display device 115, recognizes the occurrence of the maintenance event, and starts an operation for solving the maintenance event. Thus, in such a case, the current screen automatically transitions to a screen for a moving image, thus cutting out the need of the user operation. Further, if the opening of the cover is detected, the play of a partial moving image representing the work for opening the cover is omitted, and the play of the moving image is started from a partial moving image representing the next work, so that the operability for the user is improved.

Other Embodiments

In the above exemplary embodiments, a description has been given taking as an example the image forming apparatus 100 having a plurality of functions such as a copy function and a scanner function. Alternatively, the present invention is also applicable to an image processing apparatus having only some of these functions.

According to the present invention, it is possible to notify a user of a content to which the user should pay attention, before presenting to the user a moving image representing works required to solve a particular maintenance event occurring in an image processing apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2016-007425, filed Jan. 18, 2016, which is hereby incorporated by reference herein in its entirety.

What is claimed is:
1. An image forming apparatus comprising:
a first conveying path for conveying a sheet, the first conveying path being able to be pulled out by a user when a predetermined cover is open;
a second conveying path for conveying a sheet conveyed through the first conveying path,
a detection unit configured to detect a sheet jam occurring on the first conveying path or the second conveying path;
a locking mechanism configured to lock, based on the detection unit detecting a sheet jam occurred on both of the first conveying path and second conveying path, the predetermined cover so as not to be opened; and a display control unit configured to display a predetermined screen for notifying a user that the predetermined cover is locked in a case where the detection unit detects a jam occurred on both of the first conveying path and the second conveying path, wherein, in a case where the display control unit changes a display to a moving image indicating how to remove the jammed sheet from the predetermined screen displayed in accordance with a detection of the jam that occurred on both of the first conveying path and the second conveying path, the display control unit performs control to play the moving image without waiting for a user's instruction to play the moving image, and in a case where the display control unit displays a moving image indicating how to remove the jammed sheet in accordance with a detection of a jam that occurred on either the first conveying path or the second conveying path without displaying the predetermined screen, the display control unit performs control to wait for the user's instruction to play the moving image before playing the moving image.

2. The image forming apparatus according to claim 1, wherein on the first conveying path, a toner image is transferred to a sheet and the transferred toner image is fixed to the sheet.

3. The image forming apparatus according to claim 2, wherein a secondary transfer roller for transferring a toner image to a sheet and a fixing unit device for fixing the toner image transferred by the secondary transfer roller to the sheet are configured in such a manner that the secondary transfer roller and the fixing device are able to be pulled out together with the first conveying path.

4. The image forming apparatus according to claim 1, wherein, in accordance with receipt of a user operation for instructing changing of display to the moving image when the predetermined screen is displayed, the display control unit changes display from the predetermined screen to the moving image.

5. The image forming apparatus according to claim 1, wherein, in a case where a sheet jam is detected in a predetermined location which is not related to the predetermined cover, the display control unit performs control to display a moving image indicating how to remove the detected jam without displaying the predetermined screen.

6. The image forming apparatus according to claim 1, wherein the display control unit combines a plurality of partial moving images each representing a different one of a plurality of pieces of work necessary for removing a detected sheet jam and displays the plurality of partial moving images as a single moving image.

7. The image forming apparatus according to claim 6, wherein the display control unit displays the single moving image together with a bar indicating a total play time of the plurality of partial moving images.

8. The image forming apparatus according to claim 6, further comprising:

a first storage unit configured to store a plurality of partial moving images each set for a different one of a plurality of pieces of work to be performed on the image forming apparatus;

a second storage unit configured to store, in association with jam identification information for identifying a sheet jam, information indicating a combination of partial moving images to be played; and an acquisition unit configured to, based on information indicating a combination of partial moving images which is stored in the second storage unit in association with jam identification information for identifying a detected sheet jam, acquire a plurality of partial moving images to be played from among the plurality of partial moving images stored in the first storage unit, wherein the display control unit combines the plurality of partial moving images acquired by the acquisition unit and displays the plurality of partial moving images as a single moving image.

9. A control method for controlling an image forming apparatus which includes a first conveying path for conveying a sheet, the first conveying path being able to be pulled out by a user when a predetermined cover is open, a second conveying path for conveying a sheet conveyed by the first conveying path, and a detection unit configured to detect a sheet jam occurring on the first conveying path or the second conveying path, the control method comprising:

locking, based on the detection unit detecting a sheet jam occurred on both of the first conveying path and second conveying path, the predetermined cover so as not to be opened; and displaying a predetermined screen for notifying a user that the predetermined cover is locked in a case where the detection unit detects a jam occurred on both of the first conveying path and the second conveying path, wherein, in a case of changing a display to a moving image indicating how to remove the jammed sheet from the predetermined screen displayed in accordance with a detection of the jam that occurred on both of the first conveying path and the second conveying path, playing the moving image without waiting for a user's instruction to play the moving image, and in a case of displaying a moving image indicating how to remove the jammed sheet in accordance with a detection of a am that occurred on either the first conveying path or the second conveying path without displaying the predetermined screen, waiting for the user's instruction to play the moving image before playing the moving image.

10. A non-transitory storage medium having stored therein a computer-readable program for causing a computer to execute a control method for an image forming apparatus which includes a first conveying path for conveying a sheet, the first conveying path being able to be pulled out by a user when a predetermined cover is open, a second conveying path for conveying a sheet conveyed by the first conveying path, and a detection unit configured to detect a sheet jam occurring on the first conveying path or the second conveying path, the control method comprising:

locking, based on the detection unit detecting a sheet jam occurred on both of the first conveying path and second conveying path, the predetermined cover so as not to be opened; and displaying a predetermined screen for notifying a user that the predetermined cover is locked in a case where the detection unit detects a jam occurred on both of the first conveying path and the second conveying path, wherein, in a case of changing a display to a moving image indicating how to remove the jammed sheet from the predetermined screen displayed in accordance with a detection of the jam that occurred on both of the first conveying path and the second conveying path, playing the moving image without waiting for a user's instruction to play the moving image, and in a case of displaying a moving image indicating how to remove the jammed sheet in accordance with a detection of a jam that occurred on either the first conveying path or the second conveying path without displaying the predetermined screen, waiting for the user's instruction to play the moving image before playing the moving image.

\* \* \* \* \*